P. G. LAGERBÄCK.
VISE.
APPLICATION FILED APR. 12, 1917.

1,246,438.

Patented Nov. 13, 1917.

INVENTOR:
P. G. LAGERBÄCK
BY: H. van Oldenmark
ATTORNEY.

UNITED STATES PATENT OFFICE.

PER GUSTAF LAGERBÄCK, OF SALTSJÖ-DUFNÄS, SWEDEN.

VISE.

1,246,438.   Specification of Letters Patent.   Patented Nov. 13, 1917.

Application filed April 12, 1917. Serial No. 161,648.

*To all whom it may concern:*

Be it known that I, PER GUSTAF LAGERBÄCK, a subject of the King of Sweden, residing at Saltsjö-Dufnäs, in the Kingdom of Sweden, have invented new and useful Improvements in Vises, of which the following is a specification, reference being had therein to the accompanying drawing.

This invention relates to a vise in which the jaws, after the ordinary adjustment by means of a screw spindle, are still more forced toward one another by means of a device in the shape of a toggle-joint.

Figure 1:
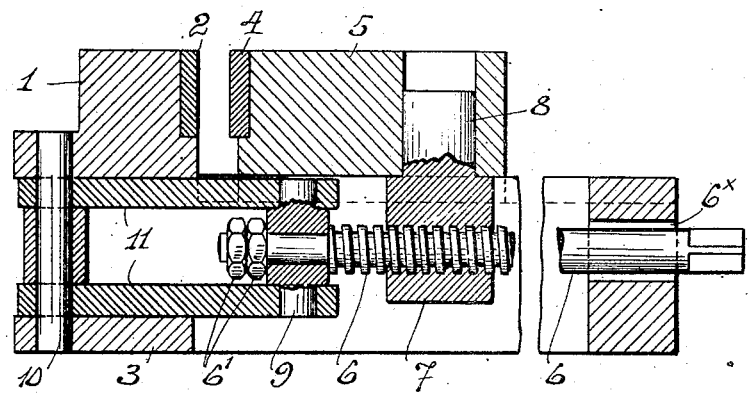
Figure 2:
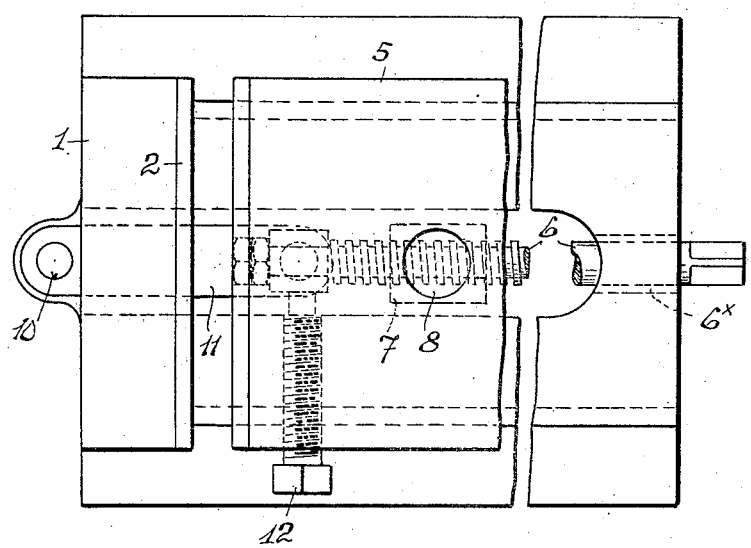

One form of the invention is illustrated as an example in the accompanying drawing. Figure 1 is a vertical section of the bench-vise. Fig. 2 is a plan view of the same.

The carrier 1 of the stationary jaw 2 is firmly fixed to the frame 3 of the vise, in which the slide 5 carrying the movable jaw 4 is mounted. A screw spindle 6 is in screw-threaded engagement with a nut 7, which is connected with a bolt 8, rotatably mounted in the slide 5. The said spindle 6 extends through a square part of a cross-head 9. The said cross-head is pivoted to two arms 11, which are swingable around a bolt 10, fixed in the frame 3 and may form together a frame-work. On the end of the screw-spindle 6 nuts $6^1$ are provided bearing against the square part of the cross-head 9. The opening $6^x$, provided in the frame for the outer end of the screw-spindle 6, is sufficiently wide to permit the said spindle to swing laterally for some distance. In the frame 3 a screw-bolt 12 or the like is provided in screw-threaded engagement with the same. The said screw-bolt 12 is substantially perpendicular to the screw spindle 6 and may be forced with its inner end against the square part of the cross-head 9.

The vise described above acts in the following manner: By rotating the screw-spindle 6 the slide 5 is moved toward the stationary jaw 2 by the bolt 8, while the arms 11 and the screw-spindle 6 are located in a straight line. By tightening the screw-bolt 12 the cross-head 9 is forced laterally, so that the screw-spindle 6 and the arms 11 form an angle with one another and a straight line connecting the bolts 8 and 10 and consequently the jaws 4 and 2 are brought nearer to one another. Consequently, the arms 11 and the screw-spindle 6 act like a toggle-joint for forcing the jaws toward one another.

Having now described my invention, what I claim as new and desire to secure by Letters Patent is:

1. In a vise, the combination of a frame and a fixed and a movable jaw with a screw spindle, a nut in screw-threaded engagement with the said spindle and pivotally connected with the movable jaw, a part swingably mounted in the said frame and pivotally connected with the screw-spindle, forming together with the same a toggle-joint, and means for actuating the said toggle-joint.

2. In a vise, the combination of a frame and a fixed and a movable jaw with a screw-spindle, a nut in screw-threaded engagement with the said spindle and pivoted to the movable jaw, a part swingably mounted in the said frame and pivotally connected with the screw-spindle, forming together with the same a toggle-joint, and a screw-bolt in screw-threaded engagement with the frame and substantially perpendicular to the said toggle-joint, the said screw-bolt being adapted to actuate the toggle-joint.

In witness whereof, I have hereunto signed my name.

PER GUSTAF LAGERBÄCK.

Copies of this patent may be obtained for five cents each, by addressing the "Commissioner of Patents, Washington, D. C."